UNITED STATES PATENT OFFICE 2,541,663

CATALYST FOR THE SYNTHESIS OF HYDROCARBONS

Jerry A. Pierce and Roger W. Richardson, Baton Rouge, La., assignors to Standard Oil Development Company, a corporation of Delaware No Drawing. Application November 15, 1946, Serial No. 710,232

1 Claim. (Cl. 260—449.6)

The present invention is concerned with improved catalysts. The invention is more particularly concerned with catalysts suitable for use in the synthesis of hydrocarbons and for the hydrogenation of hydrocarbons. In accordance with our process improved hydrocarbon synthesis and hydrogenation catalysts are prepared by plating aluminum with an active catalyst as for example with a metal selected from the group consisting of iron, cobalt or nickel. This is accomplished by the partial reaction of the salt of the selected metal with aluminum.

It is well known in the art to conduct hydrocarbon synthesis reactions by contacting hydrogen and oxides of carbon with catalysts under various temperature and pressure conditions. The catalyst employed is usually selected from the iron group metals, as for example, iron, cobalt and nickel. The catalysts are utilized either alone or are employed in conjunction with carriers, such as kieselguhr, diatomaceous earth, synthetic gels, silica, and alumina. Promoters, such as oxides of sodium, potassium, chromium, zinc, aluminum, magnesium, and the rare earth metals are used with the iron group metals. These catalysts are employed in either fixed bed or fluid catalyst operations.

The temperatures employed in the synthesis reaction vary widely, as for example, in the range from about 300° F. to about 800° F. and are generally in the range from about 350° F. to about 750° F. The pressures, likewise, vary considerably and are a function of other operating conditions, such as catalyst employed, activity of the catalyst, character of the feed gases and the temperature utilized. Pressures in the range from about 1 to 100 and higher atmospheres have been suggested. The character of the feed gases introduced into the synthesis reaction zone depends somewhat on the particular temperatures and pressures, and upon the catalyst employed. For example, when employing cobalt type catalyst, it is preferred to use about 1 mol of carbon monoxide to about 2 mols of hydrogen, while when an iron catalyst is utilized, a 1/1 to 4/1 mol ratio of hydrogen to carbon monoxide in the feed synthesis gases is desirable.

The synthesis gases comprising hydrogen and carbon monoxide are produced by various procedures. Methane or natural gas may be oxidized with a reducible metal oxide, with pure oxygen or with gases comprising oxygen. Other feed stocks may comprise coal, shale and other hydrocarbons. The reaction may be conducted in a single or in a plurality of stages. For example, one procedure is to employ a two-stage reforming process using steam and carbon dioxide for the production of carbon monoxide and hydrogen. When employing methane as feed gas and reducing the same with a reducible metal oxide, the reactions are generally conducted at temperatures in the range from about 1400° F. to about 2000° F. When the synthesis gases are produced, by utilizing oxygen and natural gas, the temperatures in the reaction zone are usually in the range from about 2000 to about 3000° F.

It has, heretofore, been known in the art to contact gases and solids by passing the gases upwardly through an enlarged treating zone, containing a body of finely divided solids to be contacted, at a controlled velocity to maintain the solids in the treating zone in a quasi-liquid like state. Under properly controlled conditions, the subdivided solid particles are not only maintained in a highly turbulent, quasi-liquid and ebullient state, but there exists a rapid and overall circulation of the fluidized solids throughout the fluid bed.

Processes of this character, wherein fluidized solids are contacted with gases, have a number of inherent and important advantages. For example, intimate contact between the gases and the fluid subdivided solids is secured. It is also possible to maintain a substantially uniform temperature throughout the bed as a result of the extremely rapid transfer of heat from one section of the bed to the other because of the rapid circulation of the fluid subdivided solids. Furthermore, due to the rapid transfer of heat between the solids under these conditions, it is possible to readily add or extract heat from the mass at an extremely rapid rate. In fluidized operation the catalyst particles generally comprise particles having particle sizes in the range from about 0 to 200 microns and higher. These particles are maintained in a fluid, ebullient state by means of upflowing suspending gases, velocity of which is in the range from about 0.1 to 5 feet per second.

One difficulty encountered in hydrocarbon synthesis reactions is that when using as a catalyst a metal selected from the iron group as for example, iron, cobalt, or nickel, carbon tends to build up on the catalyst under conditions existing in the synthesis reaction zone. Furthermore as the carbon content of the catalyst increases the attrition and loss of catalyst increases appreciably.

We have, however, now discovered an improved catalyst which may be readily used in a hydrocarbon synthesis reaction without incurring appreciable attrition and loss of the catalyst. In accordance with our invention we prepare hydrocarbon synthesis and hydrogenation catalysts by plating aluminum with iron or cobalt or nickel with or without the addition of a promoter. Our catalyst is prepared by reacting aluminum with a salt of a metal.

Our product prepared by the process outlined consists of a finely powdered material suitable for employment in fluid hydrocarbon synthesis units. Our product likewise can be manufactured in the form of granules suitable for use in fixed bed equipment. The particles are presized and require no further classification. The iron is attached to the aluminum as an integral part and is in a highly active form. On the other hand metallic combination of iron or aluminum made by thermal methods are not usually satisfactory as the resulting material is an ingot which offers much resistance to granulation or pulverization. Also, a homogeneous alloy is not chemically as active as the bi-metallic couples made in accordance with our process.

The process of our invention may be readily understood by the following example illustrating embodiments of the same:

Example 1

A 20% solution of $FeCl_3.6H_2O$ was prepared. One liter of this solution was mixed with 160 grams of granular aluminum. During the course of the reaction, hydrogen was evolved. After a period of from about 15–30 minutes the ferric chloride solution was drained off the metal, which was then rinsed, and the water removed. The catalyst product is preferably preserved under iso-octane or other volatile, non-reactive hydrocarbon solvent. The catalyst produced consists of granular aluminum cores plated with a porous and active coating of metallic iron.

Example 2

A catalyst prepared in accordance with Example 1 was contacted with synthesis feed gas comprising hydrogen and carbon monoxide in a hydrocarbon synthesis reaction zone. A feed ratio of 1.6 mols of hydrogen per mol of carbon monoxide was employed. The temperatures of the synthesis reaction zone was about 625° F. while the pressure was about 250 lbs. per square inch. The feed rate was approximately two volumes of synthesis gas per volume of catalyst per hour. A carbon monoxide conversion of 97.6% was obtained. The selectivity was 175 cc. of hydrocarbons having four carbon atoms in the molecule and higher boiling constituents per cubic meter of hydrogen and carbon monoxide consumed. The conversion based upon hydrocarbons having three carbon atoms in the molecule and higher boiling constituents was 233 cc. per cubic meter of hydrogen and carbon monoxide consumed.

In general, our process comprises plating aluminum with a metal as for example, iron, cobalt or nickel. Experience has shown that the time of the reaction is dependent upon the size of the particles of aluminum and the temperature and concentration of the metal salt solution utilized. For example, when employing iron, it may be desirable to vary the iron concentration of the salt. Furthermore, the time of treatment will depend upon the factors enumerated. For example when employing a 20% solution of $FeCl_3.6H_2O$ and 8–10 mesh aluminum the time of contact is generally in the range from about 15 to 30 minutes. During this time period approximately 10 to 15% of iron is deposited on the aluminum. The temperature used is preferably in the range from about 100–150° F. A desirable temperature is in the range of about 125–135° F.

When powdered aluminum is employed, care must be exercised to control the reaction since the amount of heat evolved is relatively high. Usually we prefer to employ a quantity not exceeding two liters of the solution and to add to it the powdered aluminum. Under these conditions, the time of contact should not exceed about 5 minutes. If the reaction is allowed to proceed too long, all the aluminum becomes dissolved and is replaced by iron powder.

Satisfactory salts are for example, any soluble salts of iron, cobalt or nickel. Specific salts are for example the sulfates, the nitrates and the chlorides. Under certain conditions an iron carbonyl solution would be satisfactory.

We claim:

Improved hydrocarbon synthesis reaction which comprises introducing carbon monoxide and hydrogen into a hydrocarbon synthesis reaction zone maintaining pressures and temperatures in said reaction zone at synthesizing conditions, contacting said feed gas in said reaction zone with a catalyst in the form of a fluidized mass consisting essentially of a bimetallic couple of aluminum and iron.

JERRY A. PIERCE.
ROGER W. RICHARDSON.

REFERENCES CITED

The following references are of record in the file of this patent:

UNITED STATES PATENTS

| Number | Name | Date |
| --- | --- | --- |
| 1,043,580 | Eldred | Nov. 5, 1912 |
| 1,801,382 | Wietzel et al. | Apr. 21, 1931 |
| 2,120,538 | Andrews | June 14, 1938 |
| 2,360,787 | Murphree | Oct. 17, 1944 |
| 2,393,909 | Johnson | Jan. 29, 1946 |